US006256566B1

(12) United States Patent
Kamiya et al.

(10) Patent No.: US 6,256,566 B1
(45) Date of Patent: Jul. 3, 2001

(54) LIFT MECHANISM CONTROLLER AND CONTROL METHOD FOR INDUSTRIAL VEHICLES

(75) Inventors: Toshikazu Kamiya; Kunio Maki, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/210,302

(22) Filed: Dec. 11, 1998

(30) Foreign Application Priority Data

Dec. 15, 1997 (JP) .................................................. 9-345292

(51) Int. Cl.[7] .............................. G06F 7/70; G06F 19/00

(52) U.S. Cl. .................................. 701/50; 701/1; 701/49; 172/4.5; 172/9; 37/347; 37/348

(58) Field of Search .................................... 701/1, 38, 48, 701/49, 50; 172/4.5, 9; 37/347, 348

(56) References Cited

U.S. PATENT DOCUMENTS

| | | | | |
|---|---|---|---|---|
| 4,768,636 | * | 9/1988 | Ito et al. | 477/71 |
| 5,462,122 | * | 10/1995 | Yamamoto et al. | 701/50 |
| 5,487,428 | * | 1/1996 | Yamamoto et al. | 701/50 |
| 5,555,942 | * | 9/1996 | Matsushita et al. | 701/50 |

FOREIGN PATENT DOCUMENTS

| | | |
|---|---|---|
| 58-100099 | 6/1983 | (JP) . |
| 58-119600 | 7/1983 | (JP) . |
| 63-196500 | 8/1988 | (JP) . |
| 7-242398 | 9/1995 | (JP) . |

* cited by examiner

*Primary Examiner*—William A. Cuchlinski, Jr.
*Assistant Examiner*—Gertrude Arthur
(74) *Attorney, Agent, or Firm*—Morgan & Finnegan, LLP

(57) ABSTRACT

A lift vehicle and a method for initializing a controller for controlling a lifting mechanism of lift vehicle. The controller controls the maximum forward tilt angle of a mast by controlling a solenoid of a hydraulic circuit. The controller employs a stored map or equation that defines a relationship between the forward tilt limit and another parameter. When the mast is tilted at two degrees, a CPU reads the detection value of a tilt angle sensor and sets it as a reference value. The reference value is used to calibrate the controller. The same function information can be used for many types of lift vehicles by selecting the appropriate control ranges for each vehicle.

19 Claims, 5 Drawing Sheets

LIFT MECHANISM CONTROLLER AND CONTROL METHOD FOR INDUSTRIAL VEHICLES

BACKGROUND OF THE INVENTION

The present invention relates to industrial vehicles such as forklifts, and more specifically, to a lifting mechanism controller and an industrial vehicle having the lifting mechanism controller.

Japanese Unexamined Patent Publication Nos. 7-2496 and 7-61792 describe a controller that controls the fork and the mast of a forklift, independent of manipulation by the driver. The controller stores a map for controlling movements of the fork and mast. The Publications describe a position sensor for detecting the fork position and the mast angle and a state sensor for detecting the operating state of the vehicle. The controller sets a target value corresponding to a target fork height (or mast angle) based on a detection value of the state sensor and the map. When the position sensor detects a value corresponding to the target value, the controller stops the movement of the fork (or mast).

The installed position of the fork, mast and the position sensor with respect to a vehicle body varies in each vehicle. As a result, for a given value detected by the position sensor, the actual position of the fork and mast varies from one vehicle to another. In the prior art, the values corresponding to the target position of the fork and mast are stored in a map in advance. However, the stored data is shared by various vehicles and this lowers the precision of controlling the target position of the fork and mast.

This may cause problems when high precision is required in limiting the movement of the fork and mast. Therefore, there is a need for a controller that precisely controls the position of the fork and mast in consideration of the various installed positions of the fork, mast and sensor.

SUMMARY OF THE INVENTION

A first objective of the present invention is to provide a controller that controls the lifting mechanism of industrial vehicles. A second objective of the present invention is to provide a lifting mechanism controller that can be shared among various types of industrial vehicles.

To achieve the above objectives, the industrial vehicle of the present invention includes a load lifting mechanism and a detector for detecting the position of the lifting mechanism with respect to the vehicle. The detector outputs a signal indicating the current position. The industrial vehicle further includes a storage device for storing function information. The function information represents a relationship between a limit position of the lifting mechanism and a parameter that concerns the current operating conditions. The industrial vehicle further includes a controller for applying the function information to limit the movement of the lift mechanism depending on the value of the parameter. The controller is calibrated in each individual vehicle.

The present invention also provides a method for initializing a controller for an industrial vehicle. The method includes moving a lift mechanism on the vehicle to a known position and reading a reference value. The reference value is a signal from a sensor for detecting the position of the lift mechanism. The method further includes preparing function information for defining a relationship between a limit position of the lift mechanism and a parameter. The parameter concerns the operating conditions of the vehicle. The method further includes storing the function information for later use by a controller for controlling the limit position during operation of the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

A first embodiment of the present invention will now be described in reference to FIGS. 1–4.

Figure 2:
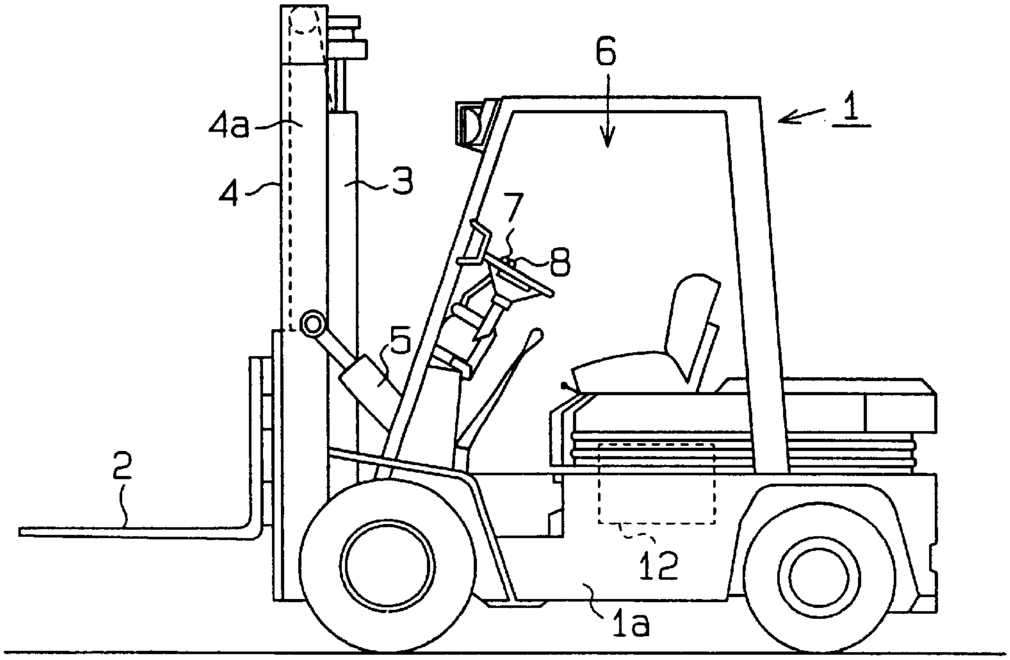
FIG. 2 is a side view of a forklift having the lifting mechanism controller of FIG. 1.

As shown in FIG. 2, a forklift 1 includes a fork 2, a mast 4 for supporting the fork 2 along the mast, a lift cylinder 3 for driving the fork 2, and a tilt cylinder 5 for inclining the mast 4. A hydraulic circuit, which is provided in a vehicle body 1*a*, drives the lift cylinder 3 and the tilt cylinder 5. A driver's compartment 6 includes a lift lever 7 and a tilt lever 8. The lift lever 7 is used to drive the lift cylinder 3, and the tilt lever 8 is used to drive the tilt cylinder 5.

Figure 3:
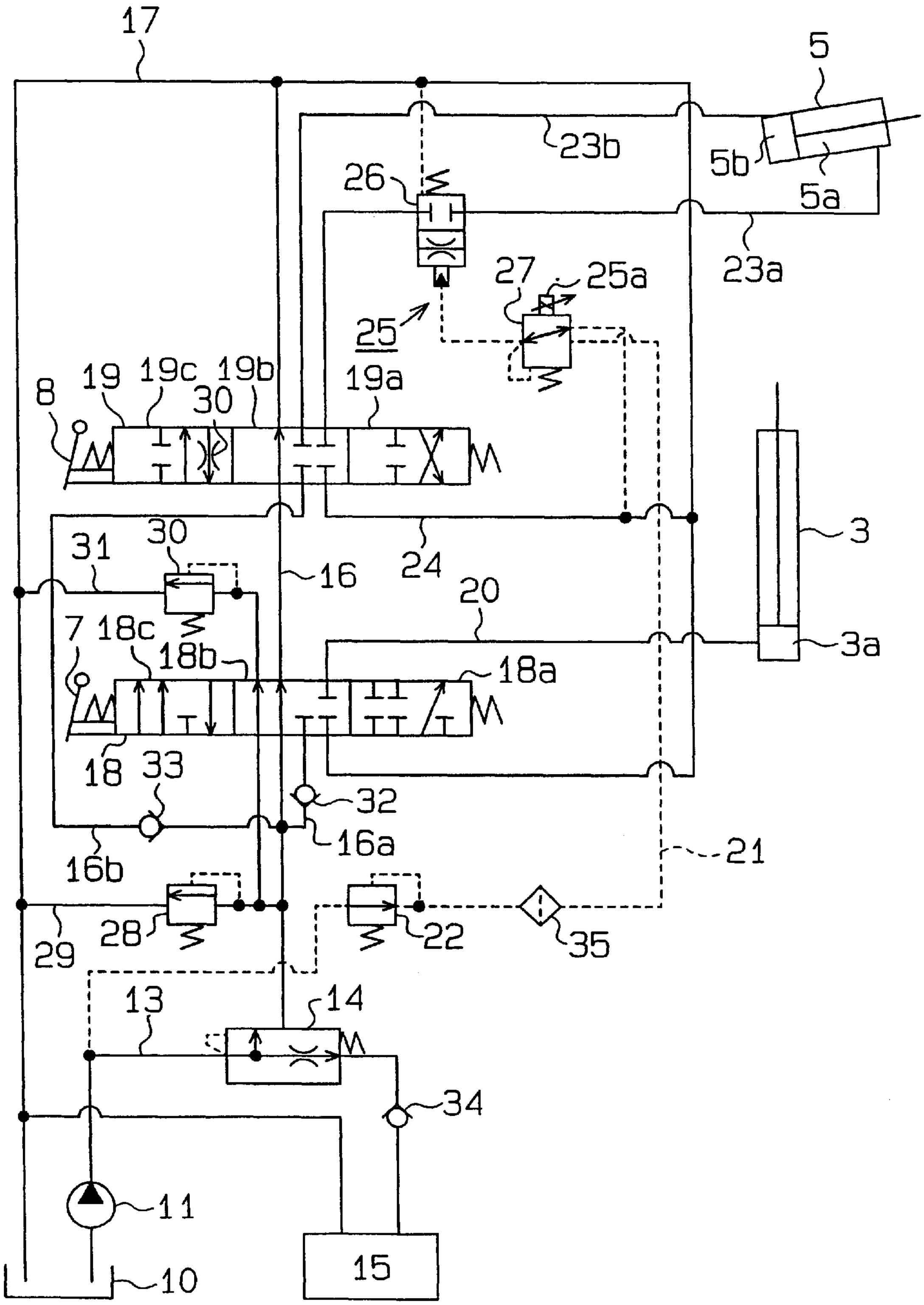
FIG. 3 is a schematic diagram of a hydraulic circuit according to the first embodiment.

The hydraulic circuit for driving the lift cylinder 3 and the tilt cylinder 5 is shown in FIG. 3.

A pump 11, which is driven by an engine 12 shown in FIG. 2, draws hydraulic oil from the oil tank 10. The drawn hydraulic oil flows to a flow divider 14 through a passage 13. In the flow divider 14, the hydraulic oil is pressurized to a predetermined pressure value and then divided into a flow to the hydraulic circuit for lifting and a flow to a hydraulic circuit 15 for power steering.

The hydraulic oil used for lifting enters a supply passage 16. The supply passage 16 is connected to a return passage 17 for returning the hydraulic oil to the oil tank 10. A manual switch valve 18 for lifting and a manual switch valve 19 for tilting are provided in series in the supply passage 16.

The lift valve 18 is a three-position switch valve, which is shifted by the lift lever 7. When the lift lever 7 is moved to the up position, the lift switch valve 18 is shifted to a first position 18*a*. When the lift lever 7 is moved to the neutral position, the lift switch valve 18 shifts to a second position

18*b*. When the lift lever 7 is moved to the down position, the lift switch valve 18 is shifted to a third position 18*c*.

When the lift switch valve 18 is shifted to the first position 18*a*, a passage 16*a*, which branches from the supply passage 16, is connected to a lift passage 20. As a result, the oil is supplied to a bottom chamber 3*a* of the lift cylinder 3 through the lift passage 20. This raises the fork 2. On the other hand, when the lift switch valve is shifted to the third position 18c, the lift passage 20 is connected to the return passage 17. Then, the oil drains from the bottom chamber 3*a* and returns to the tank 10. This lowers the fork 2. Further, when the lift switch valve 18 is positioned at the second position 18*b*, oil cannot exit or enter the bottom chamber. This fixes the position of the fork 2. The passages 16*a* and 20 form a hydraulic circuit of a lifting system.

The tilt switch valve 19 is also a three-position switch valve and is shifted by the tilt lever 8. When the tilt lever is moved to the rearward inclination position, the tilt switch valve 19 is shifted to a first position 19*a*. When the tilt lever 8 is positioned to the neutral position, the tilt switch valve 19 is shifted to a second position 19*b*. When the tilt lever 8 is moved to the forward inclination position, the tilt switch valve 19 is shifted to a third position 19*c*.

When the tilt switch valve 19 is positioned to the first position 19*c*, a passage 16*b*, which branches from the supply passage 16, is connected to a rearward inclination passage 23*a*, which is connected to a rod chamber 5*a* of the tilt cylinder 5. Simultaneously, a forward inclination passage 23*b*, which is connected to a bottom chamber 5*b* of the tilt cylinder 5, is connected to a drain passage 24, which is connected to the return passage 17. As a result, some oil is supplied to the rod chamber 5*a* and some oil drains from the bottom chamber 5*b*. Then, the tilt cylinder 5 retracts to rearwardly incline the mast 4.

On the other hand, when the tilt switch valve 19 is shifted to the third position 19*c*, some oil is supplied to the bottom chamber 5*b* and some oil drains from the rod chamber 5*a*. This extends the tilt cylinder 5 and forwardly inclines the mast 4. Further, when the tilt switch valve 19 is positioned at the second position 19*b*, oil cannot exit or enter the rod chamber 5*a* or the bottom chamber 5*b*. This stops inclination movement of the mast 4. The passages 16*b*, 23*a*, 23*b*, 24 form a hydraulic circuit of a tilting system for driving the tilt cylinder 5.

When the lift switch valve 18 is positioned at the first position 18*a*, a relief valve 28 drains extra oil to a passage 29 so that the pressure of the hydraulic circuit of lifting system is maintained at a predetermined value. Similarly, when the tilt switch valve 19 is shifted to the first position 19*a* or the third position 19*c*, the relief valve 30 drains extra oil to a passage 31. Check valves 32, 33, 34 prevent the reverse flow of the oil.

The hydraulic oil pressure produced by the pump 11 is transmitted to a pilot passage 21, which is connected to the passage 13. A pressure reducing valve 22, which is provided in the pilot passage 21, adjusts the downstream oil pressure to a predetermined pressure, which is called the pilot pressure. A filter 35 filters foreign particles from the oil and prevents foreign particles from entering into an electromagnetic valve system 25.

To lock the mast 4, regardless of the manipulation of the tilt lever 8, the electromagnetic valve system 25 is provided in the rearward inclination passage 23*a*. The electromagnetic valve system 25 includes a control valve 26 and a proportional solenoid valve 27. The proportional solenoid valve, which is provided in the pilot passage 21, regulates the pilot pressure, the force of which drives a spool of the control valve 26. The electromagnetic valve system 25 is controlled by an electric current that is applied to a solenoid 25*a*.

Figure 4:
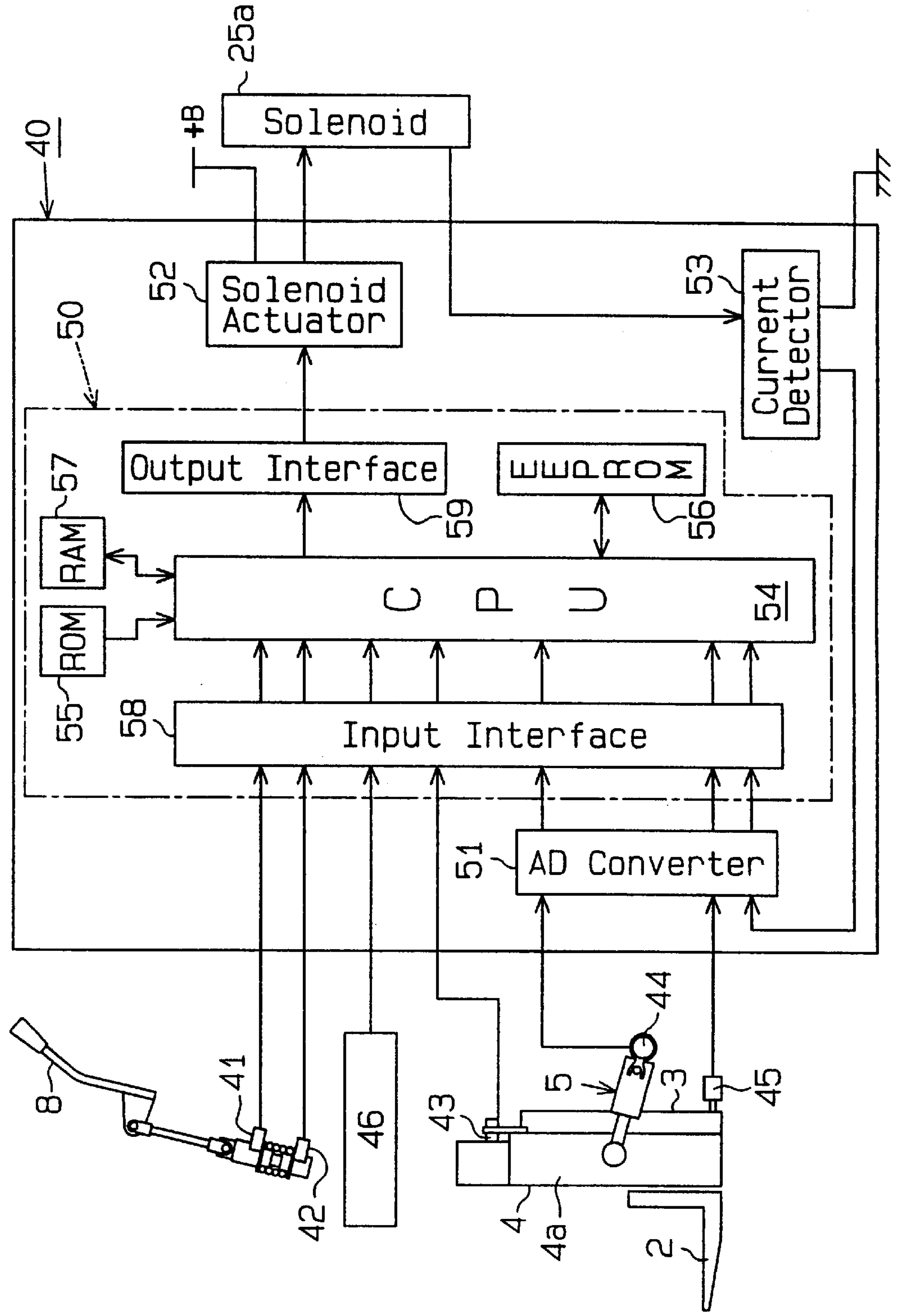
FIG. 4 is a block diagram showing the electric circuit of the first embodiment.

A controller 40 shown in FIG. 4 controls the current supplied to the solenoid 25*a*. This controls the forward inclination limit angle of the mast 4. For example, lifting of the rear wheels caused by moving the center of gravity too far forward is avoided by limiting the forward inclination of the mast 4. The forklift 1 includes various sensors for detecting necessary values for the inclination angle limit control. The sensors include a forward inclination switch 41, a rearward inclination switch 42, a fork sensor 43, an angle sensor 44 and a pressure sensor 45.

The forward inclination switch 41 detects whether the tilt lever is moved to the forward inclination position. The rearward inclination switch 42 detects whether the tilt lever 8 is moved to the rearward inclination position. Each switch 41, 42 is, for example, a micro-switch. The fork sensor 43 is located on the upper part of the outer mast 4*a*. The sensor 43, which is a proximity sensor, is turned on when the fork 2 is raised to or over a predetermined height and turned off when the fork 2 is below the predetermined height. The angle sensor 44 detects the inclination angle of the mast 4. The angle sensor includes, for example, a potentiometer. The pressure sensor 45 detects a load weight M, which is carried by the fork 2, by measuring the oil pressure of the bottom chamber 3*a* of the lift cylinder 3. The switches 41, 42 and the sensor 45 send detection values, or signals to a CPU 54.

Figure 1:
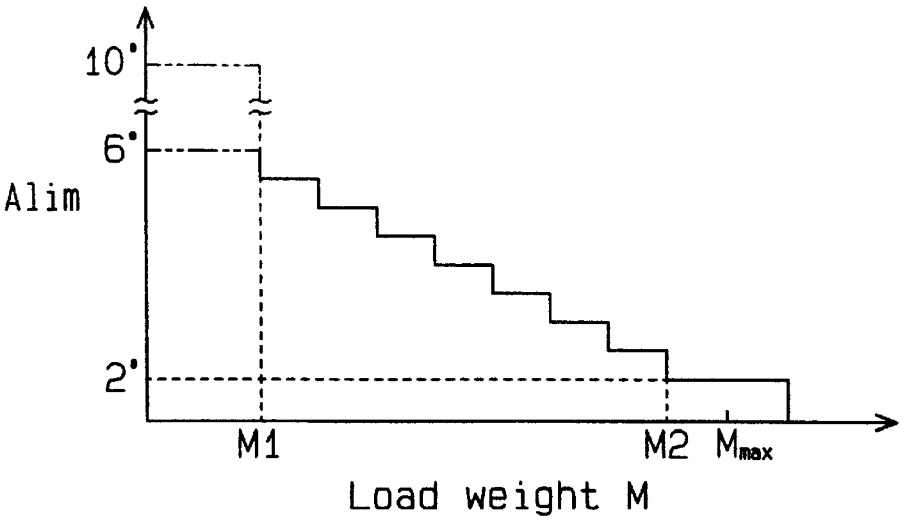
FIG. 1 shows a map used by a lifting mechanism controller according to a first embodiment of the present invention.

A compensation apparatus 46 with a keyboard is connected to the controller 40. The compensation apparatus 46 is used to compensate for the manufacturing error in each vehicle. A map shown in FIG. 1 is made for each forklift 1 by manipulating a keyboard with reference to information displayed by the compensation apparatus 46. The CPU 54 refers to the map so that the forward inclination angle of the mast 4 is limited in accordance with at least one parameter. In the first embodiment, the forward inclination limit angle Alim is calculated based on a load amount M.

An electric circuit of the forklift 1 will now be described with reference to FIG. 4.

The controller 40 includes a microcomputer 50, an A/D converter 51, a solenoid actuator 52 and a current detector 53. The microcomputer 50 includes CPU 54, ROM (Read Only Memory) 55, EEPROM (Electrically Erasable Programmable ROM) 56, RAM (Random Access Memory) 57, an input interface 58 and an output interface 59.

The forward inclination switch 41, the rearward inclination switch 42, the fork sensor 43 and the compensation apparatus 46 are connected to the CPU 54 through the input interface 58. The angle sensor 44 and the pressure sensor 45 are connected to the CPU 54 through the A/D converter and the input interface 58. The solenoid actuator 52 is connected to the CPU 54 through the output interface 59.

The CPU 54 outputs an instruction signal corresponding to a target current value to the solenoid actuator 52. The instruction signal is, for example, a PWM (pulse width modulation) signal. The collector of a transistor (not shown), which is built in the solenoid actuator 52, is connected to the positive terminal (+B) of a battery, and the emitter is connected to a first terminal of the solenoid 25*a*. The transistor is switched on and off in accordance with the PWM signal from the CPU 54. This controls the current fed to the solenoid 25*a*.

A second terminal of the solenoid 25*a* is connected to the current detector 53. The current detector 53, which is serially connected to the solenoid 25*a*, detects the value of current fed to the solenoid 25*a*. A signal corresponding to the detected value is fed back to the CPU 54 through the A/D converter 51. The CPU 54 compensates for the instruction value based on the feedback, so that the current fed to the solenoid 25*a* will match the target value.

The ROM 55 stores a forward inclination control program, a map setting program and data required for executing the programs.

The forward-inclination control program judges whether the conditions for forward inclination control are met based on the detection values of the fork sensor 43 and the pressure sensor 45. The conditions of the forward inclination program are, for example, as follows: the fork 2 must be at or above a predetermined height (fork sensor 43 is on); and the load on the fork sensor must be equal to or above a predetermined value (the detection value of the pressure sensor 45 must be equal or above the predetermined value M1). When the two conditions are fulfilled, the control operation proceeds. Then, the microcomputer 50 calculates the forward inclination limit angle Alim corresponding to the value of the current load M based on the map of FIG. 1. Further, the microcomputer 50 monitors the detection value of the angle sensor 44 and controls electromagnetic valve system 25 to stop the inclining movement of the mast 4 when the detection value coincides with the forward inclination limit angle Alim. The map of FIG. 1, which is set for each vehicle after the forklift 1 is manufactured, is stored in EEPROM 56.

The map setting program sets a map of FIG. 1 for each vehicle. The forklift 1 includes three types. Each type has a different maximum forward inclination angle (three, six or ten degrees). The range of the forward inclination control differs for each type. For example, the three-degree type has a control range of two to three degrees, the six-degree type has a control range of two to six degrees, and the ten-degree type has a control range of two to ten degrees.

As shown by the vertical axis of the graph of FIG. 1, the range of the inclination angle on the map is two to six degrees. This range is large enough to cover the control ranges of the three types of vehicles and is thus used for all three types of vehicles. However, the maximum load Mmax, which is shown on the horizontal axis of the graph of FIG. 1, differs in each vehicle type. Accordingly, the inclination of the graph of FIG. 1 differs for each vehicle type. To avoid complexity of map formation deriving from this, the ROM 55 stores set values M1 and M2. The set value M1 is the value of the load weight corresponding to a forward inclination limit angle Alim of six degrees. The set value M2 is the value of the load weight corresponding to a forward inclination limit angle Alim of two degrees. The set value M2 is smaller than the maximum load Mmax by a predetermined value. The set value M1 is a control-starting load used for initiating the forward inclination angle control in the six-degree or ten-degree type vehicles. The values M1, M2 are set for each type of vehicle and registered in the map setting program by selecting a type of vehicle from those displayed by the compensation apparatus 46. The selected data determines the map formation range and the inclination. In this way, the data for the map differs in each vehicle type, and the program for setting the map is shared by all types of vehicles.

Subsequently, the CPU 54 reads the detection value of the angle sensor 44 when the mast 4 is inclined by two degrees to decide a reference value for the map formation. The detection value of the angle sensor 44 is the reference value, and a mast inclination of two degrees is a calibration point. The reference inclination angle, which is two degrees, is equal to the forward inclination limit angle Alim of the maximum load Mmax. This angle is selected to improve the precision of control when the load amount M is high. The ROM 55 stores the map inclination data (angle control range two to six degrees, M1, M2) and an arithmetic expression for automatically forming the map from the reference value. The map is formed within a load weight range that extends beyond the maximum load Mmax.

A map setting operation will now be described.

The map setting operation is performed for each forklift after the forklift 1 is manufactured. Various types of vehicles are displayed on the map setting screen of the compensation apparatus 46. The appropriate type of forklift 1, for which the map is to be set, is selected by manipulating the keyboard while watching the screen. As a result, the CPU 54 reads the set values M1, M2 from the ROM 55 that correspond to the selected vehicle type.

Subsequently, the mast 4 is inclined by two degrees by manipulating the tilt lever B. The compensation apparatus 46 is placed in a reference value input mode by operating the keyboard. Then the CPU 54 reads the detection value of the angle sensor 44 at the two degree reference inclination. In this way, the required data for forming a map (angle control range, M1, M2, reference value) is gathered.

The CPU 54 automatically calculates a map from the data. In the calculation process, the current of the sensor 44 corresponding to the reference value is set as a value corresponding to M2. Then, the range (two to six degrees) of the forward inclination limit angle Alim is equally divided at 0.5 degrees intervals. Every time the value of the load weight M decreases by a certain amount, the forward inclination limit angle Alim is incremented by 0.5 degree, and a current corresponding to each angle is registered to each load weight M. The map shown in FIG. 1 is automatically formed by repeating the process. The CPU 54 stores the map in the EEPROM 56. In this way, a map is formed for each forklift 1. Accordingly, the map is not affected by differences in the installation of the mast 4 and the angle sensor 44 from one vehicle to another. In the first embodiment, when the load weight is M2 or greater, the forward inclination limit angle Alim is set to 2 degrees.

When the forklift is being operated, the CPU 54 executes the forward inclination angle program at certain intervals (for example, several ten milliseconds). The CPU 54 judges whether the conditions for forward inclination limit control are established or not based on signals from the fork sensor 43 and the pressure sensor 45. When the conditions are not met, the mast 4 may incline forward to the maximum angle if the operator holds the tilt lever 8 at the forward inclination position.

On the other hand, when the conditions for the forward inclination limit are met, the CPU 54 calculates the forward inclination limit angle Alim corresponding to the load weight M using the map of FIG. 1. The CPU 54 monitors a detection value from the angle sensor 44. The CPU 54 controls the current fed to the electromagnetic valve system 25 to stop the mast 4 when the detection value coincides with the forward inclination limit angle Alim.

In the present invention, a shock control procedure for cushioning the shock when the mast is stopped is also performed. In this control procedure, the electromagnetic valve system 25 starts closing when the mast 4 inclines to a value smaller by a predetermined amount than the forward inclination limit angle Alim corresponding to the load weight M or Alim. Then, the electromagnetic valve system 25 is controlled to make the inclination velocity zero when the mast reaches the forward inclination limit angle Alim.

The mast 4 is stopped at the forward inclination limit angle Alim corresponding to the load weight M even when the tilt lever is positioned at the forward inclination position by an operator when a heavy load is lifted to a relatively high position. Accordingly, the center of gravity of the vehicle is prevented from moving too far forward and the rear wheels are not lifted off the ground. When the tilt lever 8 is operated by mistake, the mast 4 stops at the forward inclination limit angle Alim corresponding to the load weight M.

As shown in FIG. 1, the map is set to cause the forward inclination limit angle Alim to vary like stairs relative to the load weight M. Accordingly, for most load weight values, the mast 4 stops at a certain inclination angle even if the detected value of the load weight M varies more or less. Therefore, the precision of stopping position of the mast 4 does not deteriorate even when the detection precision of the pressure sensor 45 is low.

The map is also formed within the range of two to six degrees for the type of vehicle having a maximum forward inclination angle of three degrees. In this case, forward inclination limit control is performed only when the load weight M corresponds to a forward inclination angle range of two to three degrees. Accordingly, only a portion of the map of FIG. 1 is used. In the ten-degree type vehicle, the mast 4 is limit controlled in the range of two to 5.5 degrees according to the map of FIG. 1. The forward inclination limit control is not performed within the range of 5.5 degrees to ten degrees.

The first embodiment has the following advantages.

The formation of the map for the forward inclination limit control is automatically started when the keyboard of the compensation apparatus 46 is operated with the mast 4 precisely inclined at the reference angle, or two degrees. Accordingly, the map is easily set and the precision of stopping the mast 4 at the appropriate forward inclination limit angle Alim is improved.

The forward inclination limit angle Alim varies stepwise relative to the load weight M. Accordingly, the mast 4 is normally stopped at a certain inclination angle even when the detection value of the load weight M varies slightly.

The same map setting apparatus is shared by different types of vehicles by setting the inclination range of the map to two to six degrees.

The formation of the map is performed using the reference value. The reference value, which is a calibration point for a forward inclination of two degrees, corresponds to the maximum load Mmax. Accordingly, the mast 4 is stopped with higher precision when the load weight M is relatively heavy.

Figure 5:
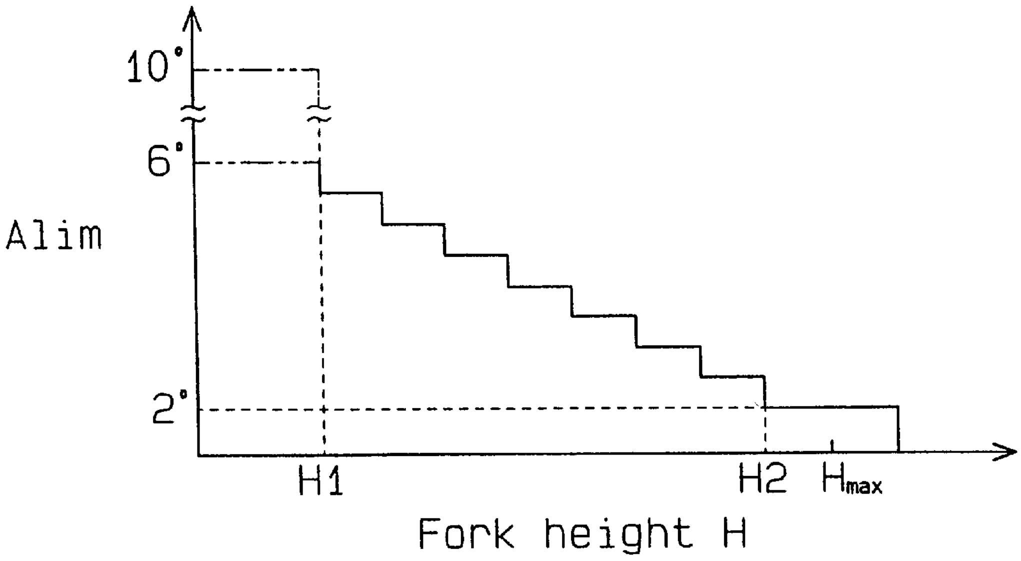
FIG. 5 shows a map used in a lifting mechanism controller according to a second embodiment of the present invention.

A second embodiment of the present invention will now be described with reference to FIG. 5.

In the second embodiment, the forward inclination limit angle Alim is determined as a function of the fork height H. Unlike the fork sensor 43 of the first embodiment, the fork sensor of the second embodiment continuously detects the fork height H. ROM 55 stores data required for automatically forming a map of FIG. 5. The data includes the setting range of the forward inclination limit angle Alim (two to six degrees), set values H1, H2 of the fork height. The set values H1, H2 corresponding to the vehicle type are registered on the map by selecting the vehicle type on the map setting screen of the compensation apparatus 46. The setting range of the forward inclination limit angle (two to six degrees) is set to cover the ranges of different types of vehicles.

The reference inclination angle of the mast 4 is set to two degrees, which is the forward inclination limit angle Alim corresponding to the maximum fork height Hmax. When the angle of the mast 4 is held at two degrees to this angle, the detection value of the angle sensor 44 is selected as a reference value. In other words, the angle of two degrees is a calibration point. Hi is the value of the fork height H that corresponds to the forward inclination upper limit angle (six degrees). The value H2 is smaller than the maximum fork height Hmax by a predetermined value.

Like the first embodiment, the map setting operation is performed by selecting a vehicle type on the map setting screen of the compensation apparatus 46, adjusting the inclination of mast 4 to two degrees, and reading the reference value. After this is completed, the map shown in FIG. 5 is automatically formed as in the first embodiment.

Prior to performing inclination limit control, the detection value of the weight sensor (load weight M) must be a predetermined value or higher and the detection value of the fork sensor 43 must indicate a predetermined fork height or higher. When the conditions are met, the CPU 54 determines the forward inclination limit angle Alim corresponding to the current fork height H based on the map of FIG. 5. When the mast 4 inclines to the limit angle Alim, the inclining movement of the mast 4 is stopped. In this way, the forward inclination limit angle Alim can be varied in accordance with the fork height H.

Figure 6:
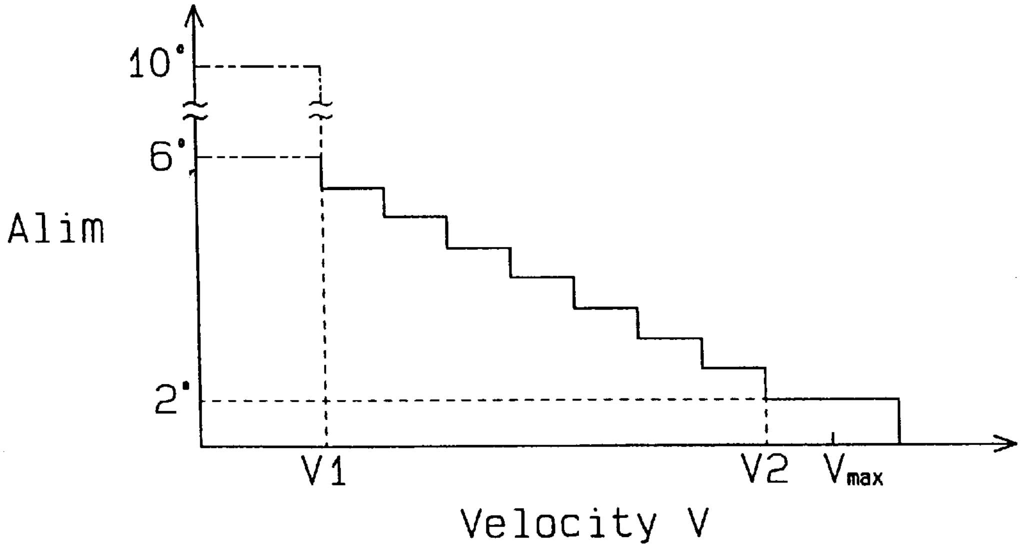
FIG. 6 shows a map used in a lifting mechanism controller according to a third embodiment of the present invention.

A third embodiment of the present invention will now be explained with reference to FIG. 6.

In the third embodiment, the forward inclination limit angle Alim is determined as a function of the vehicle velocity V. The forklift includes a velocity sensor (not shown). The detection value of the velocity sensor is input to the controller 40. The ROM 55 stores data required for automatically forming the map of FIG. 6. The data includes a setting range (two degrees to six degrees) of the forward inclination limit angle Alim and the set values V1, V2 of the velocity V. The set values V1, V2 corresponding to a vehicle type are registered in the map by selecting and inputting the vehicle type on the map setting screen of the compensation apparatus 46. The setting range (two to six degrees) of the forward inclination limit angle Alim in the map is large enough to be shared by different types of vehicles.

A reference forward inclination limit angle Alim, which is two degrees, corresponds to the maximum velocity Vmax. When the mast 4 is held at an inclination of two degrees, the detection value of the sensor 44 is used as a reference value for forming the map. The value of V1 is a velocity corresponding to the forward inclination upper limit angle Alim of six degrees. V2 is smaller than the maximum velocity Vmax by a predetermined value.

Similar to the first embodiment, the map setting operation includes selecting a vehicle type on the screen of the compensation apparatus 46, positioning the mast 4 at the calibration point, and reading the reference value. After the operation is finished, the map of FIG. 5 is automatically formed in the same way as that of the first embodiment.

Prior to performing forward inclination control, the detection value of the velocity sensor must be greater than a predetermined value. When that condition is fulfilled, the CPU 54 determines the forward inclination limit angle Alim corresponding to the current velocity V based on the map of FIG. 6. Then, when the mast 4 is inclined to the forward inclination limit angle Alim, the mast 4 is stopped. In this way, the forward inclination limit angle Alim can be varied based on the vehicle velocity V.

Figure 7:
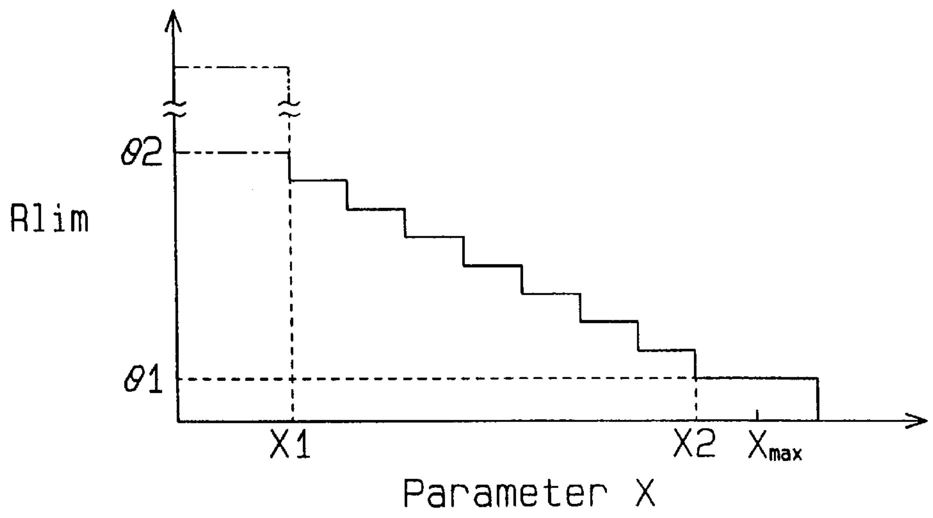
FIG. 7 shows a map used in a lifting mechanism controller according to a fourth embodiment of the present invention.

A forth embodiment of the present invention will now be described by reference to FIGS. 7 and 8.

An industrial vehicle 1 of the fourth embodiment has a clamp 61 instead of a fork. A map is used to control the rotation angle of the clamp 61.

Figure 8:
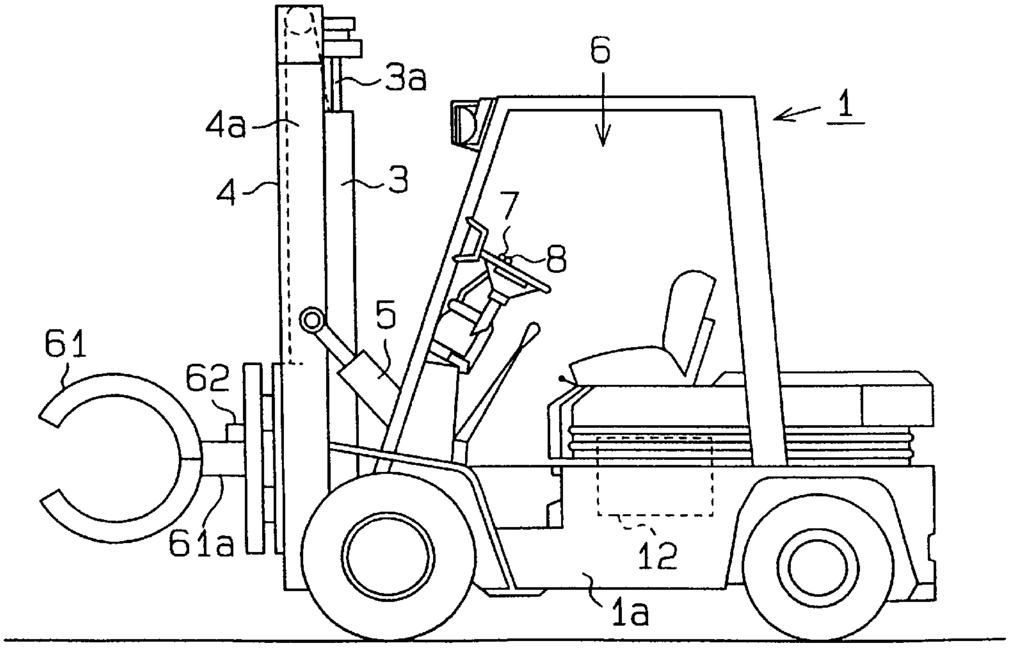
FIG. 8 is a side view of an industrial vehicle equipped with a round clamp according to the forth embodiment.

As shown in FIG. 8, the clamp 61, which moves up and down along the mast 4, closes to grasp a round object and rotates about the axis of the shaft 61*a*. A rotation angle sensor 62 for detecting the rotation angle of the shaft 61*a* is provided in the mast 4. The rotation range of the shaft 61*a* is limited by the rotation limit angle Rlim, which is determined by a control parameter X. For example, the control parameter X may be the diameter of a round object grasped by the clamp or the weight of the round object. The diameter can be indirectly detected if a sensor for detecting the opening angle of the clamp 61 is provided. The weight of the round object can be indirectly detected based on the output from the pressure sensor that detects the hydraulic pressure of the lift cylinder 3.

The industrial vehicle 1 includes a hydraulic circuit (not shown) and a controller similar to that of FIG. 4. The controller controls an electromagnetic valve (not shown) provided in the hydraulic circuit. As a result, the rotation of the clamp is controlled. The ROM 55 stores set values X1, X2 for forming the map shown in FIG. 7. The set values X1, X2 differ for each vehicle type. The set values X1, X2 corresponding to a vehicle type are registered by selecting the vehicle type on the screen of the compensation apparatus 46. The value of X2 is smaller than the maximum diameter Xmax (or a maximum weight) by a predetermined value.

Further, the ROM 55 stores limit angles θ1, θ2 for specifying the setting range of the rotation limit angle Rlim of the clamp 61. The values θ1, θ2 are selected to cover vehicles having different rotation control ranges of the clamp 61.

The map setting operation is performed in a procedure similar to those of the first to third embodiments. That is, a vehicle type is selected and input on the screen of the compensation apparatus, then, the clamp 61 is precisely rotated to the rotation angle θ1, which is a calibration point. Then, the reference value is input by manipulation of the keyboard of the compensation apparatus 46.

The rotation angle limit control is performed only if the control parameter X is a predetermined value or higher. The control parameter X may be either the opening angle of the clamp 61 or the load weight. Then, the CPU 54 determines the rotation limit angle Rlim corresponding to the value of the parameter X based on the map of FIG. 7. When the clamp 61 rotates to the rotation limit angle Plim, the CPU 54 stops the rotation of the clamp 61. Since the clamp 61 is actually positioned at the calibration point θ1 when the map is formed and the resulting detection value of the sensor is used as the reference value, the precision of stopping the clamp 61 is improved.

The present invention is not limited to the first to fourth embodiments but may further be embodied as follows.

The map-making apparatus may be replaced by an equation-making apparatus. That is, a mathematical function may be used instead of a data map. For example, the map of FIG. 1 may be replaced by a function such as Alim=f(M). The function includes coefficients and constants that are dependent on the vehicle type or that compensate for manufacturing errors. The exact coefficients and constants are determined during a set up operation similar to that for determining the map of the preceding embodiments.

The position control of the present invention is not limited to the forward inclination angle of the mast. The height of the fork may also be controlled.

The present invention may also be applied to control the position of forks that move forward or sideways to reach objects.

In the first to third embodiments, the detection value of the sensors when the mast is perpendicular or when the inclination angle is zero may be used as reference value. In this case, adjusting the position of the mast to the calibration point is easier.

Instead of a map that varies stepwise, a map that varies linearly may also be formed. In this case, since the forward inclination limit angle Alim is finely set in accordance with the value of the control parameter, the mast position is finely controlled by the control parameter.

A map setting apparatus may also be provided exclusively for each type of the vehicle. That is, specific data (for example, set values M1, M2) for determining the inclination and the range of the map for each vehicle is set in the map setting apparatus in advance. In this case, the operation of selecting a vehicle type by the compensation apparatus 46 is not necessary.

The forward inclination control of the mast may also be performed when the fork is lowered. In this case, one control map for when the mast is raised high and another control map for when the mast is low are preferably formed and used separately.

When the setting range of control parameters (H, V, X, M) differ in each vehicle type, selecting a vehicle type sets the setting range of the parameters corresponding the vehicle type. In this way, the map setting apparatus is shared among different vehicle types.

The present invention may not only be embodied in engine forklifts, but also in battery forklifts.

The present invention may also be embodied in controlling the lifting mechanisms of power shovels and high lift vehicles.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An industrial vehicle comprising:

a load lifting mechanism having a mast pivotally mounted on the vehicle and an attachment movably mounted on the mast;

a detector for detecting the position of the lifting mechanism with respect to the vehicle, wherein the detector outputs a signal indicating the current position;

a storage device for storing function information, wherein the function information represents a relationship between a limit position of the lifting mechanism and a parameter that concerns the current operating conditions of the vehicle, wherein the function information is changeable by the detected position of the lift mechanism; and a controller for actuating the lift mechanism based on the function information and the detected position of the lift mechanism, the controller limiting the movement of the lift mechanism depending on the value of the parameter, wherein the controller is calibrated for the vehicle by inputting the detected position of the lift mechanism when the vehicle is built.

2. The industrial vehicle according to claim 1, wherein the function information causes the limit position to vary stepwise with respect to the parameter.

3. The industrial vehicle according to claim 1, wherein the function information is a data map.

4. The industrial vehicle according to claim 3, wherein the function information is a mathematical equation.

5. The industrial vehicle according to claim 1, wherein the parameter is the weight of the load, and wherein the calibration of the function information is performed while the lifting mechanism is located at the limit position that corresponds to a relatively high load weight according to the function information.

6. The industrial vehicle according to claim 1, wherein the parameter is the velocity of the vehicle, and wherein the calibration of the function information is performed while the lifting mechanism is located at the limit position that corresponds to a relatively high velocity according to the function information.

7. A method for initializing a controller for an industrial vehicle comprising:

moving a lift mechanism on the vehicle to a known position when the vehicle is built;

detecting the lifting mechanism position by a sensor outputting a signal representing the detected position;

reading the detected position as a reference value;

preparing function information for defining a relationship between a limit position of the lift mechanism and a parameter using the reference value, wherein the parameter concerns the operating conditions of the vehicle; and storing the function information for later use by a controller for controlling the limit position during operation of the vehicle.

8. The method of claim 7, wherein the parameter is one of the weight of a load on the lift mechanism, the height of the lift mechanism, and the velocity of the vehicle.

9. The method of claim 8, wherein the parameter is the weight of the load on the lift mechanism, and the known position is the limit position corresponding to a relatively high load weight according to the function information.

10. The method of claim 8, wherein the parameter is the height of the lift mechanism, and the known position is the limit position corresponding to a relatively high position of the lift mechanism according to the function information.

11. The method of claim 7, wherein the limit position is the forward limit of tilting motion of a mast as the lift mechanism.

12. The method of claim 7, including the act of selecting a possible range of limit positions and using the selected range to calculate the function information.

13. The method of claim 7, wherein the act of calculating the function information varies the limit position in a stepwise manner with respect to the parameter.

14. The method of claim 7, wherein the function information is a data map that is referred to by the controller to determine the limit position.

15. A forklift having a mast pivotally mounted on the forklift and an attachment movably mounted on the mast, the forklift comprising:

a tilt cylinder for inclining the mast, the cylinder being disposed in a hydraulic circuit having a valve controlling hydraulic fluid with respect to the cylinder;

a first detector for detecting an angle of the mast, said first detector outputting a signal corresponding to the detected angle of the mast;

a second detector for detecting an operating condition of the forklift, said second detector outputting a signal corresponding to the detected condition;

a storage device for storing function information representing a relationship between the mast angle and the operating condition of the forklift; and a controller for outputting a control signal controlling the valve in the hydraulic circuit based on the signals from said detectors, the control signal causing the movement of the tilt cylinder to be controlled by means of the valve.

16. The forklift according to claim 15, wherein said controller has an input device for inputting the detected angle of the mast, which is detected when the forklift is built, as a reference value, thereby initializing the relation between the mast angle and the condition of the forklift.

17. The forklift according to claim 15, wherein the controller compares the detected condition of the forklift with the function information, determines a controllable range of the mast angle based on the comparison, and controls the mast movement while comparing the detected current angle of the mast with the controllable range of the mast angle.

18. The forklift according to claim 15, wherein said second detector includes at least one of a weight sensor for sensing load weight on the attachment, a height sensor for sensing height of the attachment, and a speed sensor for sensing a speed of the forklift.

19. An industrial vehicle comprising:

a load lifting mechanism having a mast pivotally mounted on the vehicle and an attachment movably mounted on the mast;

a detector for detecting the position of the lifting mechanism with respect to the vehicle, wherein the detector outputs a signal indicating the current position;

a storage device for storing function information, wherein the function information represents a relationship between a limit position of the lifting mechanism and a parameter that concerns the current operating conditions of the vehicle; and a controller for controlling the lift mechanism based on the function information and the detected position of the lift mechanism and for limiting the movement of the lift mechanism at the limit position depending on the value of the parameter, wherein when the vehicle is built, the lifting mechanism is adjusted to a known position and the controller prepares the function information using a reference positional data that corresponds to the known position.

* * * * *

UNITED STATES PATENT AND TRADEMARK OFFICE

CERTIFICATE OF CORRECTION

PATENT NO. : 6,256,566 B1
DATED : July 3, 2001
INVENTOR(S) : Toshikazu Kamiya et al.

It is certified that error appears in the above-identified patent and that said Letters Patent is hereby corrected as shown below:

<u>Column 2,</u>
Line 34, please change "to the forth embodiment." to -- to the fourth embodiment. --;

<u>Column 11,</u>
Line 50, please change "method of claim 7, including" to -- method of claim 7 including --.

Signed and Sealed this

Twenty-third Day of April, 2002

*Attest:*

JAMES E. ROGAN
*Director of the United States Patent and Trademark Office*

*Attesting Officer*